(12) United States Patent
Higuma et al.

(10) Patent No.: US 11,722,761 B2
(45) Date of Patent: Aug. 8, 2023

(54) DASHBOARD CAMERA DEVICE

(71) Applicant: TOYOTA JIDOSHA KABUSHIKI KAISHA, Toyota (JP)

(72) Inventors: Tomohito Higuma, Toyota (JP); Yohei Satomi, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/319,377

(22) Filed: May 13, 2021

(65) Prior Publication Data

US 2022/0006947 A1   Jan. 6, 2022

(30) Foreign Application Priority Data

Jul. 1, 2020 (JP) ................... 2020-114385

(51) Int. Cl.
| | | |
|---|---|---|
| *B60R 11/04* | (2006.01) | |
| *H04N 5/77* | (2006.01) | |
| *H04N 23/61* | (2023.01) | |

(52) U.S. Cl.
CPC ............ *H04N 23/61* (2023.01); *B60R 11/04* (2013.01); *H04N 5/77* (2013.01)

(58) Field of Classification Search
CPC ...... H04N 5/23218; H04N 5/77; H04N 7/181; B60R 11/04; B60R 1/00; B60R 2300/105; B60R 2300/802
USPC ........................................................ 348/148
See application file for complete search history.

(56) References Cited

U.S. PATENT DOCUMENTS

| | | | |
|---|---|---|---|
| 2010/0208076 A1 | 8/2010 | Kinoshita | |
| 2011/0035099 A1* | 2/2011 | Kobayashi | G09G 5/10 701/36 |
| 2012/0287276 A1* | 11/2012 | Dwivedi | G06K 9/00825 348/148 |
| 2016/0375827 A1 | 12/2016 | Bonhoure et al. | |
| 2018/0173236 A1 | 6/2018 | Yashiro et al. | |

(Continued)

FOREIGN PATENT DOCUMENTS

| | | | | |
|---|---|---|---|---|
| CN | 102951070 A | * | 3/2013 | ............ B60Q 1/115 |
| CN | 105960355 A | | 9/2016 | |
| CN | 108202746 A | | 6/2018 | |

(Continued)

*Primary Examiner* — Thai Q Tran
*Assistant Examiner* — Nienru Yang
(74) *Attorney, Agent, or Firm* — Sughrue Mion, PLLC

(57) ABSTRACT

A dashboard camera device including: an imaging section configured to image rearward from a self-vehicle; a recording section configured to record a video image captured by the imaging section; a headlight-flashing detection section configured to detect illumination and blinking of a headlight of a following vehicle traveling behind the self-vehicle; and a control section configured to determine a headlight-flashing threshold value based on a travel environment of the self-vehicle, the headlight-flashing threshold value being a threshold value for a change in light intensity caused by blinking of the headlight of the following vehicle as detected by the headlight-flashing detection section, and, in a case in which a change in light intensity, due to blinking of the headlight of the following vehicle, has exceeded the headlight-flashing threshold value, the control section causes the recording section to record the video image captured by the imaging section.

5 Claims, 5 Drawing Sheets

(56) References Cited

U.S. PATENT DOCUMENTS

2018/0277154 A1\* 9/2018 Mack .................... H04N 1/212

FOREIGN PATENT DOCUMENTS

| CN | 111095356 A | \* | 5/2020 | ............... G06T 7/20 |
| JP | 2012-177997 A | | 9/2012 | |
| JP | 2020-052863 A | | 4/2020 | |
| WO | 2009/048168 A1 | | 4/2009 | |

\* cited by examiner

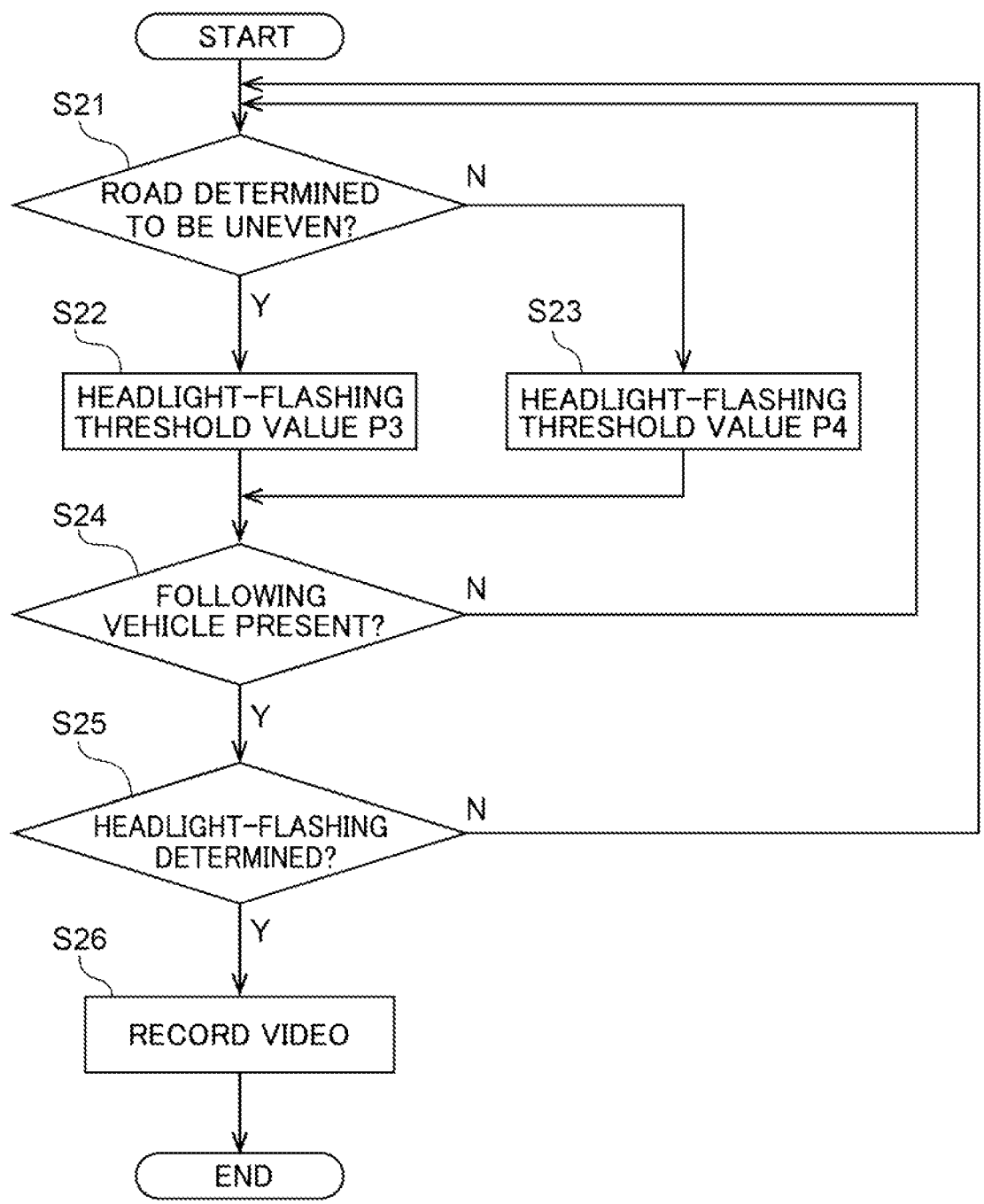

DASHBOARD CAMERA DEVICE

CROSS-REFERENCE TO RELATED APPLICATION

This application claims priority under 35 USC 119 from Japanese Patent Application No. 2020-114385, filed on Jul. 1, 2020, the disclosure of which is incorporated by reference herein.

BACKGROUND

Technical Field

The present disclosure relates to a dashboard camera device.

Related Art

Japanese Patent Application Laid-Open (JP-A) No. 2020-052863, discloses a vehicle monitoring device that detects dangerous behavior by another vehicle in the proximity of a self-vehicle, and automatically records video of the other vehicle. In the disclosed vehicle monitoring device, the behavior of a following vehicle is determined to be dangerous if the following vehicle remains within a braking distance range of the self-vehicle for a predetermine duration, and the video of the following vehicle is automatically recorded. Moreover, in the disclosed vehicle monitoring device, the behavior of the following vehicle is determined to be a specific act if the following vehicle flashes its headlights at the self-vehicle, and video of the following vehicle is automatically recorded.

Depending on the environment around the self-vehicle, it may be difficult to detect headlight-flashing by a following vehicle accurately. However, the vehicle monitoring device disclosed in JP-A No. 2020-052863, does not take this point into consideration.

SUMMARY

The present disclosure provides a dashboard camera device that may accurately detect headlight-flashing by the following vehicle.

A first aspect of the present disclosure is a dashboard camera device including: an imaging section configured to image rearward from a self-vehicle; a recording section configured to record a video image captured by the imaging section; a headlight-flashing detection section configured to detect illumination and blinking of a headlight of a following vehicle traveling behind the self-vehicle; and a control section configured to determine a headlight-flashing threshold value based on a travel environment of the self-vehicle, the headlight-flashing threshold value being a threshold value for a change in light intensity caused by blinking of the headlight of the following vehicle as detected by the headlight-flashing detection section, and, in a case in which a change in light intensity, due to blinking of the headlight of the following vehicle, has exceeded the headlight-flashing threshold value, the control section causes the recording section to record the video image captured by the imaging section.

According to the dashboard camera device of the first aspect, the control section determines the headlight-flashing threshold value based on the travel environment of the self-vehicle. The control section also causes the recording section to record the video image captured by the imaging section in a case in which the change in light intensity due to blinking of the headlight of the following vehicle has exceeded the headlight-flashing threshold value. By deciding the headlight-flashing threshold value based on the travel environment of the self-vehicle, the first aspect may accurately detect headlight-flashing, namely blinking of the headlight of the following vehicle.

A second aspect of the present disclosure, in the above aspect, may further include an acceleration detection section configured to detect a vehicle vertical direction acceleration of the self-vehicle, wherein the control section may be configured to change the headlight-flashing threshold value in a case in which the vehicle vertical direction acceleration exceeds a predetermine threshold value.

According to the dashboard camera device of the second aspect, the control section changes the headlight-flashing threshold value in a case in which the vehicle vertical direction acceleration detected by the acceleration detection section is in a state exceeding the predetermine threshold value, for example when the self-vehicle is traveling on an uneven road. Accordingly, the second aspect may accurately detect headlight-flashing, namely blinking of the headlight of the following vehicle, in a manner appropriate to the unevenness of the road along which the self-vehicle is traveling.

A third aspect of the present disclosure, in the above aspects, may further include a weather condition detection section configured to detect a weather condition at a location where the self-vehicle is present, wherein the control section may be configured to change the headlight-flashing threshold value in a case in which the weather condition has changed.

According to the dashboard camera device of the third aspect, the control section changes the headlight-flashing threshold value in a case in which the weather condition detected by the weather condition detection section has changed. Accordingly, the third aspect may accurately detect headlight-flashing, namely blinking of the headlight of the following vehicle, in a manner appropriate to the weather conditions at the location where the self-vehicle is present.

In a fourth aspect of the present disclosure, in the above aspects, the control section may be configured to: monitor, as a first light intensity, a light intensity of a low beam of the headlight of the following vehicle when illuminated; and cause the recording section to record the video image in a case in which a change in light intensity, due to blinking of a high beam of the headlight of the following vehicle with respect to the first light intensity, has exceeded the headlight-flashing threshold value.

The dashboard camera device of the fourth aspect may accurately detect headlight-flashing, namely blinking of the high beam of the following vehicle, taking into consideration the fact that the low beam of the following vehicle is illuminated.

In a fifth aspect of the present disclosure, in the above aspects, the control section may be configured to: monitor, as a second light intensity, a light intensity of a low beam of the headlight of the following vehicle when not illuminated; and cause the recording section to record the video image in a case in which a change in light intensity, due to blinking of a high beam of the headlight of the following vehicle with respect to the second light intensity, has exceeded the headlight-flashing threshold value.

The dashboard camera device of the fifth aspect may accurately detect headlight-flashing, namely blinking of the high beam of the following vehicle, taking into consideration the fact that the low beam of the following vehicle is not illuminated.

According to the above aspects, the dashboard camera device of the present disclosure may accurately detect headlight-flashing by the following vehicle.

BRIEF DESCRIPTION OF THE DRAWINGS

Exemplary embodiments will be described in detail based on the following figures, wherein:

FIG. 5 is a flowchart for explaining control by a control section.

DETAILED DESCRIPTION

Figure 1:
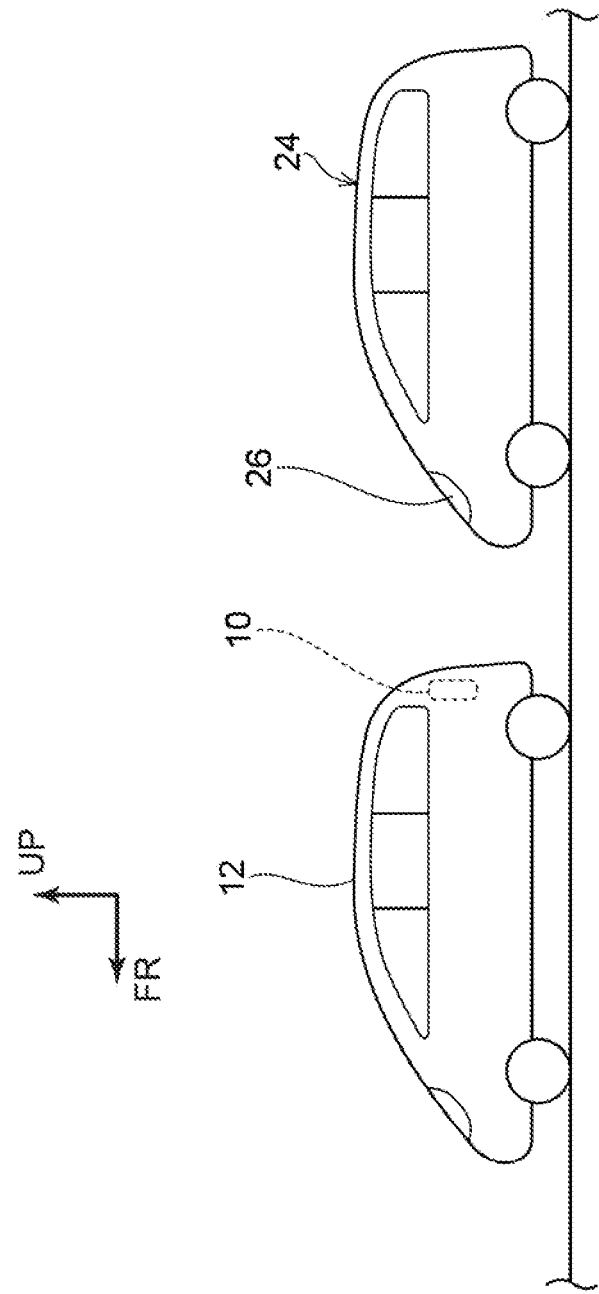
FIG. 1 is a side view schematically illustrating a self-vehicle provided with a dashboard camera device, and a following vehicle.

Explanation follows regarding a dashboard camera device according to an exemplary embodiment of the present disclosure, with reference to FIG. 1 to FIG. 5. Note that in the following explanation, reference to front, rear, left, right, up, and down directions indicates front, rear, left, right, up, and down directions with respect to a self-vehicle. Moreover, the arrow FR indicates a forward direction and the arrow UP indicates an upward direction in the drawings as appropriate.

Figure 2:
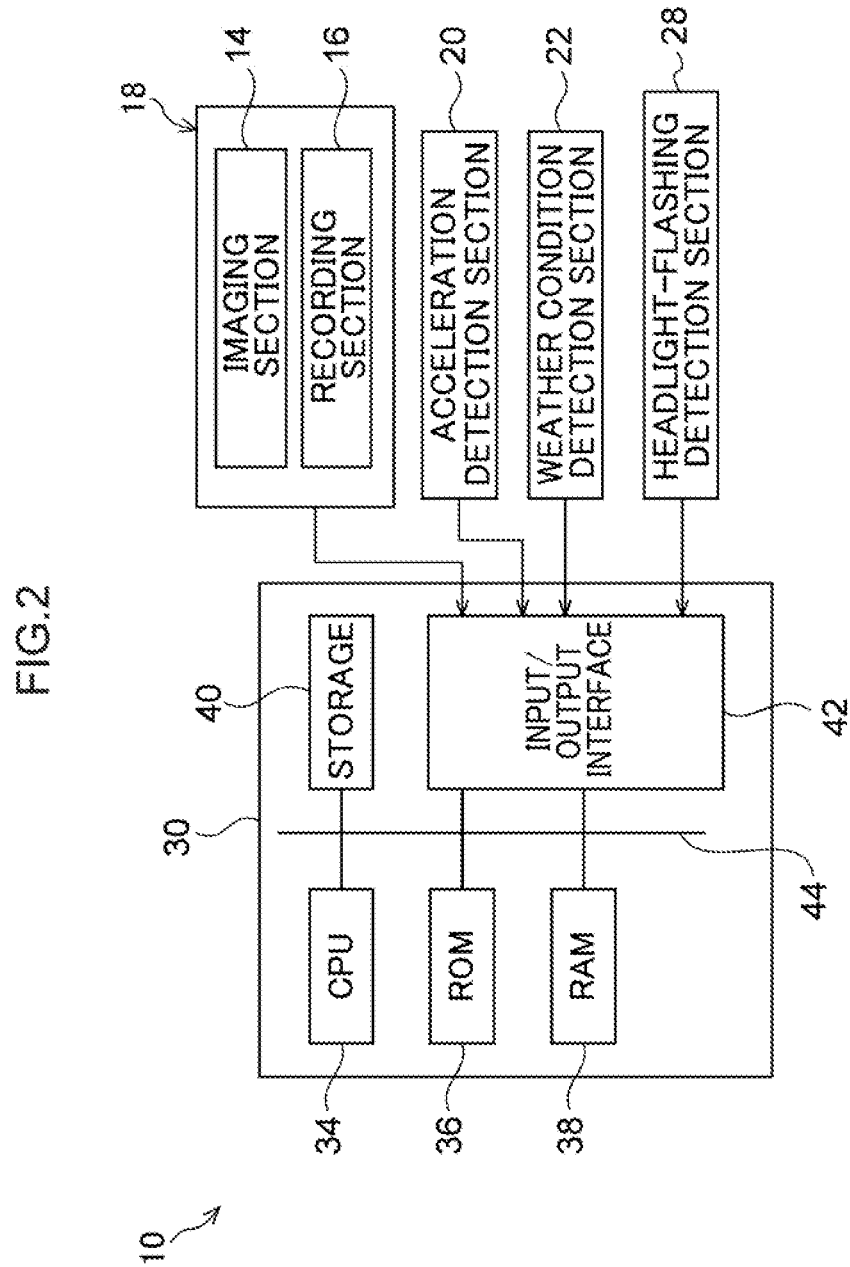
FIG. 2 is a block diagram illustrating a dashboard camera device.

As illustrated in FIG. 1, a dashboard camera device 10 of the present exemplary embodiment is provided to a rear section of a vehicle 12. As illustrated in FIG. 1 and FIG. 2, the dashboard camera device 10 is equipped with a dashboard camera unit 18. The dashboard camera unit 18 includes an imaging section 14 that images rearward from the vehicle 12 (hereafter referred to as the self-vehicle 12) equipped with the in-vehicle dashboard camera device 10, and a recording section 16 that records video images captured by the imaging section 14. The dashboard camera device 10 is also equipped with an acceleration detection section 20 that detects an acceleration of the self-vehicle 12 in a vehicle vertical direction, and a weather condition detection section 22 that detects weather conditions at the location where the self-vehicle 12 is situated. The dashboard camera device 10 is further equipped with a headlight-flashing detection section 28 that detects illumination and blinking of headlights 26 of a following vehicle 24 traveling behind the self-vehicle 12, and a control section 30. The control section 30 causes the recording section 16 to record a video image captured by the imaging section 14 when a change in light intensity caused by blinking of the headlights 26 of the following vehicle 24, as detected by the headlight-flashing detection section 28, has exceeded a predetermine threshold value.

As an example, the imaging section 14 is a color CCD camera that images rearward from the self-vehicle 12. The imaging section 14 is either fixed to a vehicle cabin inner side or a vehicle cabin outer side of the rear section of the self-vehicle 12.

The recording section 16 is configured by non-volatile memory such as flash memory, and configures the dashboard camera unit 18 together with the imaging section 14. The recording section 16 records a video image captured by the imaging section 14. Note that the recording section 16 and the imaging section 14 may either be configured by separate bodies, or may be configured as an integral unit.

The acceleration detection section 20 is an acceleration sensor for detecting a vertical direction acceleration of the self-vehicle 12. Note that the acceleration detection section 20 may be integrally provided to the dashboard camera unit 18. Alternatively, the acceleration detection section 20 may be an acceleration sensor fixed to the self-vehicle 12 (the vehicle body).

The weather condition detection section 22 includes a raindrop sensor provided to the self-vehicle 12, a color CCD camera that images the surroundings of the self-vehicle 12, and the like. In the present exemplary embodiment, a color CCD camera that is capable of distinguishing whether or not the weather conditions at the location where the self-vehicle 12 is situated are sunny, cloudy, wet, snowy, foggy, and so on is adopted as the weather condition detection section 22. Note that the color CCD camera employed as the weather condition detection section 22 may double as the color CCD camera employed as the imaging section 14.

As illustrated in FIG. 2, the headlight-flashing detection section 28 is a CCD camera or the like that images rearward from the self-vehicle 12. In the present exemplary embodiment, a color CCD camera that is capable of distinguishing between colors of the headlights 26 and turn signal lamps 32 of the following vehicle 24 is adopted as the headlight-flashing detection section 28. Note that the color CCD camera employed as the headlight-flashing detection section 28 may double as the color CCD camera employed as the imaging section 14.

As illustrated in FIG. 2, the control section 30 includes a central processing unit (CPU; a processor) 34, read only memory (ROM) 36, random access memory (RAM) 38, storage 40, and an input/output interface (I/F) 42 that communicates with external devices. These elements are connected so as to be capable of communicating with each other through a bus 44. The dashboard camera unit 18, the acceleration detection section 20, the weather condition detection section 22, the headlight-flashing detection section 28, and so on are electrically connected to the input/output interface 42. The CPU 34 is a central processing unit that executes various programs and controls the dashboard camera unit 18 and so on. Namely, the CPU 34 reads a control program from the ROM 36 or the storage 40 based on signals from the dashboard camera unit 18, the acceleration detection section 20, the weather condition detection section 22, the headlight-flashing detection section 28, and so on, and executes the control program using the RAM 38 as a workspace to control the dashboard camera unit 18 and so on.

Next, explanation follows regarding operation of the present exemplary embodiment.

Figure 3:
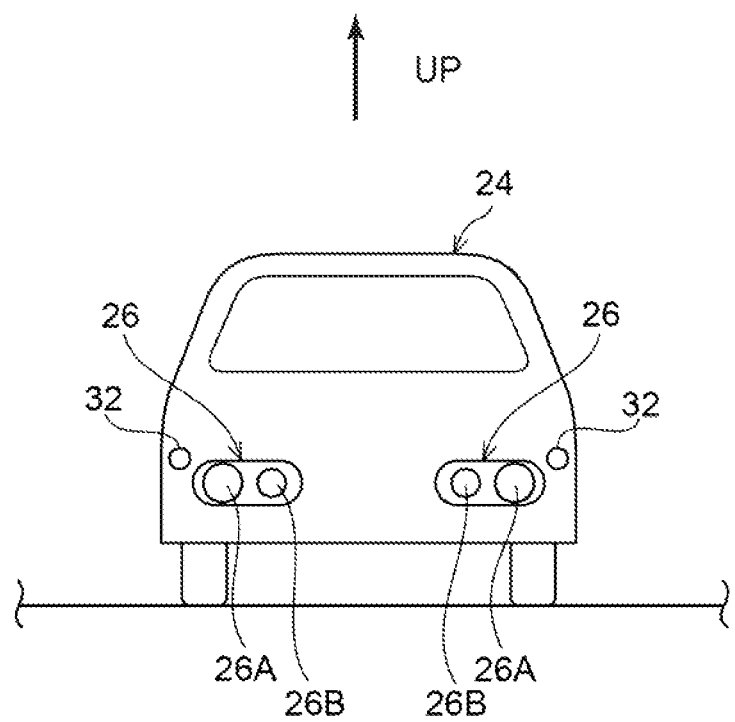
FIG. 3 is a front view schematically illustrating a following vehicle as viewed from a self-vehicle provided with a dashboard camera device.

As illustrated in FIG. 1, FIG. 2, and FIG. 3, in the dashboard camera device 10 of the present exemplary embodiment described above, the imaging section 14 images rearward from the vehicle when the self-vehicle 12 is in a travel-ready state.

Note that the control section 30 determines a headlight-flashing threshold value, this being a threshold value for a change in light intensity caused by blinking of the headlights 26 of the following vehicle 24 as detected by the headlight-flashing detection section 28, based on a travel environment of the self-vehicle 12. In a case in which a change in light intensity caused by blinking of the headlights 26 of the following vehicle 24 has exceeded this headlight-flashing threshold value, the control section 30 causes the recording section 16 to record the video image captured by the imaging section 14.

Figure 4:
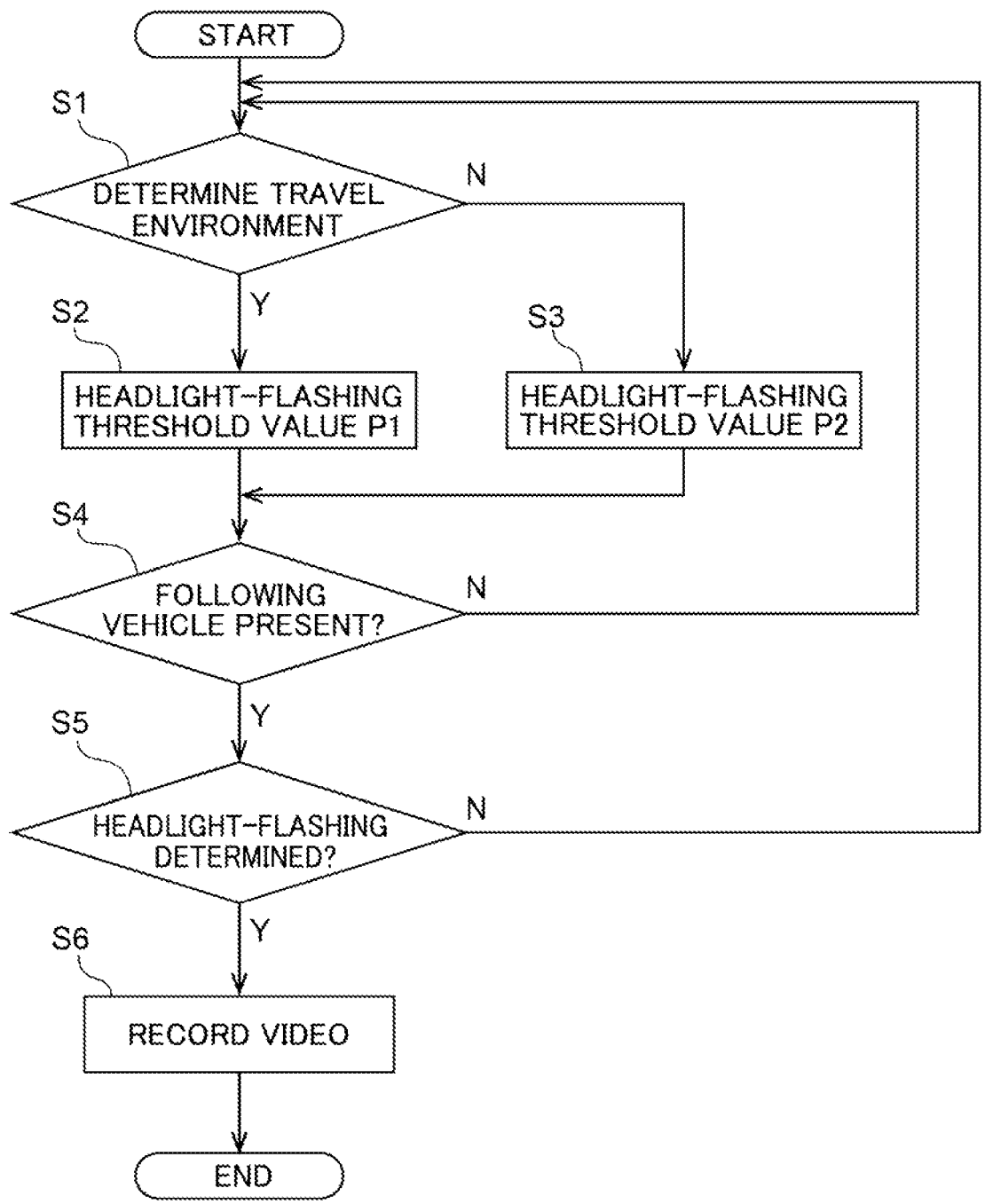
FIG. 4 is a flowchart for explaining control by a control section.

Specifically, as illustrated in FIG. 4, at step S1 the control section 30 determines the travel environment of the self-vehicle 12 so as to determine whether or not headlight-flashing by the following vehicle 24 would be easily detectable. Note that the travel environment of the self-vehicle 12 is estimated based on the weather conditions as detected by the weather condition detection section 22.

In a case in which affirmative determination is made at step S1, the control section 30 determines on P1 as the headlight-flashing threshold value at step S2. Note that the headlight-flashing threshold value P1 is a light intensity change value of the headlights 26 of the following vehicle 24 as detected by the headlight-flashing detection section 28. As an example, the headlight-flashing threshold value P1 is a value obtained by subtracting a light intensity of the headlights 26 directly before headlight-flashing from an envisaged maximum light intensity of the headlights 26 when the following vehicle 24 flashes during sunny weather. The headlight-flashing threshold value P1 may be set as appropriate based on testing and the like.

On the other hand, in a case in which negative determination is made at step S1, at step S3, the control section 30 determines on P2, this being a smaller value than P1, as the headlight-flashing threshold value. Note that the headlight-flashing threshold value P2 is a light intensity change value of the headlights 26 of the following vehicle 24 as detected by the headlight-flashing detection section 28. As an example, the headlight-flashing threshold value P2 is a value obtained by subtracting a light intensity of the headlights 26 directly before headlight-flashing from an envisaged maximum light intensity of the headlights 26 when the following vehicle 24 flashes during wet or foggy weather. The headlight-flashing threshold value P2 may be set as appropriate based on testing and the like.

At the next step S4, the control section 30 determines whether or not a following vehicle 24 is present. Namely, the control section 30 determines whether or not the headlights 26 of the following vehicle 24 have been detected by the headlight-flashing detection section 28.

In a case in which negative determination is made at step S4, the control section 30 repeats the processing from step S1 to step S4.

On the other hand, in a case in which affirmative determination is made at step S4, at step S5 the control section 30 determines whether or not headlight-flashing by the following vehicle 24 has been detected. Namely, the control section 30 either determines whether or not a light intensity change value of the headlights 26 of the following vehicle 24 as detected by the headlight-flashing detection section 28 exceeds the headlight-flashing threshold value P1 determined at step S2, or determines whether or not this value exceeds the headlight-flashing threshold value P2 determined at step S3. Note that in a case in which low beams 26A of the headlights 26 of the following vehicle 24 are illuminated, the control section 30 monitors the light intensity of these illuminated low beams 26A as a first light intensity. In a case in which a change in light intensity with respect to the first light intensity accompanying blinking of high beams 26B of the headlights 26 of the following vehicle 24 has exceeded the corresponding headlight-flashing threshold value P1 or P2, the control section 30 determines that headlight-flashing by the following vehicle 24 has been detected. On the other hand, in a case in which the low beams 26A of the headlights 26 of the following vehicle 24 are not illuminated, the control section 30 monitors the light intensity of the non-illuminated low beams 26A as a second light intensity. In a case in which a change in light intensity with respect to the second light intensity accompanying blinking of the high beams 26B of the headlights 26 of the following vehicle 24 has exceeded the corresponding headlight-flashing threshold value P1 or P2, the control section 30 determines that headlight-flashing by the following vehicle 24 has been detected. Note that the control section 30 may be set so as to determine that headlight-flashing by the following vehicle 24 has been detected in a case in which plural headlight-flashes, rather than a single headlight-flash, have been performed. Note that blinking of the high beams 26B and blinking of the respective turn signal lamps 32 may be distinguished by performing image processing that considers the color and number of the respective lamps.

In a case in which negative determination is made at step S5, the control section 30 repeats the processing from step S1 to step S5.

On the other hand, in a case in which affirmative determination is made at step S5, at step S6, the control section 30 causes the recording section 16 to record the video image captured by the imaging section 14. Namely, the control section 30 starts video-recording of the video image captured by the imaging section 14. Note that this video-recording may be stopped after a predetermine duration. Alternatively, this video-recording may be continued as long as the headlight-flashing by the following vehicle 24 continues to be detected. Alternatively, the recording section 16 may be made to record the video image starting several seconds or several tens of seconds prior to the headlight-flashing being detected. The control section 30 may use a video image, buzzer, audio, or the like to notify an occupant of the self-vehicle 12 that video-recording of the video image captured by the imaging section 14 has started.

When the video-recording of step S6 has stopped, the control section 30 ends the processing, and then repeats the processing of step S1 to step S6.

As described above, in the dashboard camera device 10 of the present exemplary embodiment, the headlight-flashing threshold values P1, P2 are determined according to changes in the weather conditions, namely the travel environment of the self-vehicle 12, thereby enabling accurate detection of headlight-flashing, namely blinking of the headlights 26 of the following vehicle 24. Note that a change in the weather conditions may also be determined based on operation of a wiper device or illumination of fog lamps.

Next, explanation follows regarding an example in which travel on an uneven road is taken into consideration when determining the travel environment.

As illustrated in FIG. 5, the control section 30 considers unevenness of the road surface when deciding a headlight-flashing threshold value, this being a threshold value for light intensity change caused by blinking of the headlights 26 of the following vehicle 24 as detected by the headlight-flashing detection section 28.

Specifically, at step S21, the control section 30 determines whether or not the self-vehicle 12 is traveling along an uneven road such as a gravel track. Note that whether or not the self-vehicle 12 is traveling along an uneven road such as a gravel track is estimated based on the vertical direction acceleration of the self-vehicle 12 as detected by the acceleration detection section 20. Specifically, the control section 30 determines that the self-vehicle 12 is traveling along an uneven road such as a gravel track in a case in which a state in which the vertical direction acceleration of the self-vehicle 12 as detected by the acceleration detection section 20 has exceeded a predetermine value continues for longer than a predetermine duration. On the other hand, the control section 30 determines that the self-vehicle 12 is not traveling along an uneven road such as a gravel track in a case in which the vertical direction acceleration of the self-vehicle 12 as detected by the acceleration detection section 20 remains in a state below a predetermine value.

In a case in which negative determination is made at step S21, at step S23 the control section 30 determines on P4 as the headlight-flashing threshold value. Note that the headlight-flashing threshold value P4 is a light intensity change value as detected by the headlight-flashing detection section 28. As an example, the headlight-flashing threshold value P4 is a value obtained by subtracting the light intensity of the headlights 26 directly before headlight-flashing from an envisaged maximum light intensity of the headlights 26 of the following vehicle 24 during headlight-flashing by the following vehicle 24 in a state in which the self-vehicle 12 is not traveling along an uneven road such as a gravel track (in a state traveling along a flat road surface or a nearly flat road surface). The headlight-flashing threshold value P4 may be set as appropriate based on testing and the like. Alternatively, the headlight-flashing threshold value P4 may be determined by adding the processing of steps S to S3 in FIG. 4 so as to take the weather conditions into consideration.

On the other hand, in a case in which affirmative determination is made at step S21, at step S22, the control section 30 determines on P3 as the headlight-flashing threshold value. Note that, in a state in which the self-vehicle 12 is traveling along an uneven road such as a gravel track, it is conceivable that the self-vehicle 12 will repeatedly jolt in the vertical direction and that the following vehicle 24 will also repeatedly jolt in the vertical direction. Thus, if the headlight-flashing threshold value were set to the same value as P4, it would be conceivable that changes in light intensity of the headlights 26 of the following vehicle 24 accompanying the repeated jolting of the self-vehicle 12 and the following vehicle 24 in the vertical direction could be falsely detected as headlight-flashing. Accordingly, in the present exemplary embodiment the headlight-flashing threshold value P3 determined at step S22 is set to a higher value than P4.

Next, at step S24, the control section 30 determines whether or not a following vehicle 24 is present. Namely, the control section 30 determines whether or not the headlights 26 of the following vehicle 24 have been detected by the headlight-flashing detection section 28.

In a case in which negative determination is made at step S24, the control section 30 repeats the processing from step S21 to Step S24.

On the other hand, in a case in which affirmative determination is made at step S24, at step S25, the control section 30 determines whether or not headlight-flashing by the following vehicle 24 has been detected. Namely, the control section 30 either determines whether or not a light intensity change value of the headlights 26 of the following vehicle 24 as detected by the headlight-flashing detection section 28 exceeds the headlight-flashing threshold value P3 determined at step S22, or determines whether or not this value exceeds the headlight-flashing threshold value P4 determined at step S23.

In a case in which negative determination is made at step S25, the control section 30 repeats the processing from step S21 to step S25.

On the other hand, in a case in which affirmative determination is made at step S25, at step S26, the control section 30 causes the recording section 16 to record the video image captured by the imaging section 14.

When the video-recording of step S26 has stopped, the control section 30 ends the processing, and then repeats the processing of step S21 to step S26.

As described above, in this example in which travel on an uneven road is taken into consideration when determining the travel environment, headlight-flashing, namely blinking of the headlights 26 of the following vehicle 24, can be accurately detected in a manner appropriate to the unevenness of the road along which the self-vehicle 12 is traveling.

Note that, although the above examples describe cases in which the following vehicle 24 is a four-wheeled vehicle, the present disclosure is not limited thereto. For example, the control section 30 may be set to start video-recording of video images by the recording section 16 in consideration of cases in which the following vehicle 24 is a motorcycle. Configuration may be made such that negative determination is made at steps S1, S21 described previously in a case in which the control section 30 is unable to distinguish whether the following vehicle 24 is a four-wheeled vehicle or a motorcycle.

In the above-described examples, setting may be made so as to take into consideration the duration for which the previously described headlight-flashing threshold values P1, P2, P3, P4 are exceeded so as to discriminate between headlight-flashing by the following vehicle 24 and inadvertent operation of a headlight switch. Moreover, configuration may be made so as to take into consideration other determination conditions that might suggest aggressive driving by the following vehicle 24. Moreover, configuration may be made so as to take into consideration such factors as automatic lighting in the self-vehicle 12, the lighting situation from other lights, the time of day/night, whether or not the self-vehicle 12 is traveling through a tunnel, and so on.

The dashboard camera device 10 of the present exemplary embodiment may be merged with an electronic mirror or the like that includes an image recognition function.

Although an exemplary embodiment of the present disclosure has been described above, the present disclosure is not limited to the above description, and obviously various other modifications may be implemented within a range not departing from the spirit of the present disclosure.

What is claimed is:

1. A dashboard camera device comprising:
   a camera configured to image rearward from a self-vehicle and to detect illumination and blinking of a headlight of a following vehicle traveling behind the self-vehicle;
   a recorder configured to record a video image captured by the camera;
   an acceleration sensor configured to detect a vehicle vertical direction acceleration of the self-vehicle; and
   a processor coupled to a memory, the processor configured to:
   set a headlight-flashing threshold value based on a travel environment of the self-vehicle, the headlight-flashing threshold value being a threshold value for a change amount of a light intensity caused by blinking of the headlight of the following vehicle as detected by the camera,
   in a case in which the vehicle vertical direction acceleration exceeds a predetermined threshold value, determine that the self-vehicle is traveling along an uneven road, and set the headlight-flashing threshold value to a higher threshold value as compared to the threshold value when the vehicle vertical direction acceleration does not exceed the predetermined threshold value, and in a case in which the change amount of the light intensity, due to blinking of the headlight of the following vehicle, has exceeded the headlight-flashing threshold value plural times, cause the camera to record the video image.

2. The dashboard camera device of claim 1, wherein the cameras is further configured to detect a weather condition at a location where the self-vehicle is present, wherein the processor is configured to change the headlight-flashing threshold value in a case in which the weather condition has changed.

3. The dashboard camera device of claim 1, wherein the processor is configured to:

monitor, as a first light intensity, a light intensity of a low beam of the headlight of the following vehicle when illuminated; and cause the camera to record the video image in a case in which the change amount of the light intensity, due to blinking of a high beam of the headlight of the following vehicle with respect to the first light intensity, has exceeded the headlight-flashing threshold value.

4. The dashboard camera device of claim 1, wherein the processor is configured to:

monitor, as a second light intensity, a light intensity of a low beam of the headlight of the following vehicle when not illuminated; and cause the camera to record the video image in a case in which the change amount of the light intensity, due to blinking of a high beam of the headlight of the following vehicle with respect to the second light intensity, has exceeded the headlight-flashing threshold value.

5. The dashboard camera device of claim 1, wherein the processor is configured to determine whether the blinking is due to the headlight of the following vehicle, based on a color of the blinking detected by the camera.

\* \* \* \* \*